United States Patent
Yamahira et al.

(10) Patent No.: US 12,166,429 B2
(45) Date of Patent: Dec. 10, 2024

(54) POWER CONVERTER

(71) Applicant: DENSO CORPORATION, Kariya (JP)

(72) Inventors: Yuu Yamahira, Kariya (JP); Toshiyuki Kouno, Kariya (JP); Hiromi Ichijyo, Kariya (JP); Kazuya Takeuchi, Kariya (JP); Tatsuya Murakami, Kariya (JP); Yuuya Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 17/954,693

(22) Filed: Sep. 28, 2022

(65) Prior Publication Data

US 2023/0012536 A1 Jan. 19, 2023

Related U.S. Application Data

(63) Continuation of application No. PCT/JP2021/007124, filed on Feb. 25, 2021.

(30) Foreign Application Priority Data

Mar. 31, 2020 (JP) .................. 2020-062638

(51) Int. Cl.
*H02M 7/537* (2006.01)
*H02K 5/22* (2006.01)
(Continued)

(52) U.S. Cl.
CPC ............ *H02M 7/537* (2013.01); *H02K 5/225* (2013.01); *H02K 11/27* (2016.01); *H02M 7/493* (2013.01); *H02P 5/74* (2013.01)

(58) Field of Classification Search
CPC ...... H02M 7/537; H02M 7/493; H02M 7/003; H02K 5/225; H02K 11/27; H02P 5/74;
(Continued)

(56) References Cited

U.S. PATENT DOCUMENTS

| | | | | |
|---|---|---|---|---|
| 8,421,388 B2* | 4/2013 | Mukai | .................. | B62D 5/0463 |
| | | | | 318/400.19 |
| 8,981,687 B2* | 3/2015 | Kuroda | .................. | H02P 27/08 |
| | | | | 318/400.04 |

(Continued)

FOREIGN PATENT DOCUMENTS

| | | |
|---|---|---|
| JP | 2012-191768 A | 10/2012 |
| JP | 2015-23619 A | 2/2015 |

(Continued)

OTHER PUBLICATIONS

U.S. Appl. No. 17/954,593, filed Sep. 28, 2022 in the name of Hashimoto et al.

(Continued)

*Primary Examiner* — David Luo
(74) *Attorney, Agent, or Firm* — Oliff PLC (57) ABSTRACT

A power converter includes a control circuit executing feedback control of a first inverter based on a detected value of a first sensor adapted to a first rotating electrical machine. The first sensor detects a current of a first busbar adapted to the first rotating electrical machine. The first busbar connects the first inverter and the first rotating electrical machine. A second busbar adapted to a second rotating electrical machine connects a second inverter and the second rotating electrical machine. The second busbar is arranged to be apart from the first sensor interposed with a converter busbar between the second busbar and the first sensor. A current of the converter flows through the converter busbar.

6 Claims, 4 Drawing Sheets

(51) Int. Cl.
    *H02K 11/27*     (2016.01)
    *H02M 7/493*     (2007.01)
    *H02P 5/74*     (2006.01)

(58) Field of Classification Search
    CPC . H02P 2201/09; B60L 2240/465; B60L 15/32
    USPC ................................................ 318/504, 494
    See application file for complete search history.

(56) References Cited

U.S. PATENT DOCUMENTS

| | | | |
|---|---|---|---|
| 9,531,309 B2* | 12/2016 | Nakao | H02P 27/08 |
| 2019/0229640 A1* | 7/2019 | Aichriedler | H02M 7/003 |
| 2019/0234996 A1 | 8/2019 | Nomura et al. | |
| 2019/0269031 A1 | 8/2019 | Ishibashi et al. | |
| 2020/0025803 A1 | 1/2020 | Esaka et al. | |

FOREIGN PATENT DOCUMENTS

| | | |
|---|---|---|
| JP | 2015-186317 A | 10/2015 |
| JP | 2016-039734 A | 3/2016 |
| JP | 2021-162416 A | 10/2021 |
| JP | 2021-164241 A | 10/2021 |
| JP | 2021-164242 A | 10/2021 |
| JP | 2021-164243 A | 10/2021 |
| WO | 2021/199803 A1 | 10/2021 |
| WO | 2021/199804 A1 | 10/2021 |

OTHER PUBLICATIONS

U.S. Appl. No. 17/941,705, filed Sep. 9, 2022 in the name of Ichijyo, Hiromi.

* cited by examiner

POWER CONVERTER

CROSS REFERENCE TO RELATED APPLICATIONS

The present application is a continuation application of International Patent Application No. PCT/JP2021/007124 filed on Feb. 25, 2021, which designated the U.S. and claims the benefit of priority from Japanese Patent Application No. 2020-062638 filed on Mar. 31, 2020. The entire disclosures of all of the above applications are incorporated herein by reference.

TECHNICAL FIELD

The present disclosure relates to a power converter.

BACKGROUND

A power converter may output a three-phase alternating current to two motors as a main motor and an auxiliary motor adopted in a vehicle.

SUMMARY

The present disclosure describes a power converter including a busbar for a first rotating electrical machine, a busbar for a second rotating electrical machine, and a sensor for the first rotating electrical machine.

BRIEF DESCRIPTION OF DRAWINGS

Objects, features and advantages of the present disclosure will become more apparent from the following detailed description made with reference to the accompanying drawings. In the drawings.

DETAILED DESCRIPTION

A power converter may include two inverters respectively for a main motor and an auxiliary motor, two sets of busbar set for transmitting power to the corresponding motors from the corresponding inverters, and current sensors. The current flowing through the busbar for transmitting the power to the main motor is detected by the current sensor provided with a magnetic core. The current flowing through the busbar for transmitting the power to the auxiliary motor is detected by the current sensor without the magnetic core. The power converter executes feedback control of the output currents provided to the corresponding motors by controlling the inverters according to the detection values of the corresponding current sensors.

A coreless current sensor may be more advantageous than a current sensor provided with a core in consideration of, for example, physical size and cost. However, the coreless current sensor is more susceptible to a magnetic field generated by a current flowing in another busbar than the current sensor provided with the core. Therefore, in the power converter providing the power to multiple motors, crosstalk is likely to occur with the busbar in another motor in a case where the current flowing through the busbar is detected by the coreless current sensor. The detected value of the current sensor of a motor may be a numerical value acquired by superimposing a frequency component of the current flowing to another motor on the current that actually flows. In the above power converter, the output current executed by the feedback control according to the detected value may be distorted.

According to an aspect of the present disclosure, a power converter includes a first inverter, a second inverter, a converter, a first busbar, a second busbar, a converter busbar adapted to the converter, a first sensor adapted to the first electrical machine, and a control circuit. The first inverter is connected to a first rotating electrical machine being a three-phase alternating current rotating machine. The second inverter is connected to a second rotating electrical machine being a three-phase alternating current rotating machine. The converter converts a direct current voltage between a direct current power supply and each of the first inverter and the second inverter. The first busbar is adapted to the first rotating electrical machine, and passes a current between the first inverter and the first rotating electrical machine. The second busbar is adapted to the second rotating electrical machine, and passes a current flowing between the second inverter and the second rotating electrical machine. The converter busbar passes a current of the converter. The first sensor is a coreless sensor that detects the current flowing through the first busbar based on a magnetic field generated by the current. The control circuit controls the first inverter based on a detected value of the first sensor.

According to the above structure, the second busbar for the second electrical machine is disposed to be apart from the first sensor for the first electrical machine with the converter busbar interposed between the second busbar and the first sensor. Therefore, it is possible to suppress the superimposition of the frequency component of the three-phase alternating current flowing through the second busbar for the second electrical machine on the detected value detected by the sensor for the first electrical machine. The controller controls the first inverter based on the detected value detected by the sensor for the first electrical machine to suppress the influence of the three-phase alternating current flowing through the second busbar for the second electrical machine and operate the first inverter. Therefore, it is possible to suppress the distortion of the output current flowing from the first inverter to the first rotating electrical machine to detect the output current through the coreless current sensor.

A power converter 100 according to an embodiment of the present disclosure is described with reference to the drawings. The circuitry structure of the power converter 100 is described with reference to FIG. 1. The power converter 100 is adapted to a vehicle such as a hybrid automobile including an internal combustion engine and a rotating electrical machine as a drive source. The power converter 100 is an apparatus that executes power conversion among a first rotating electrical machine 1, a second rotating electrical machine 2 and a direct current power supply 3 in the vehicle.

Figure 1:
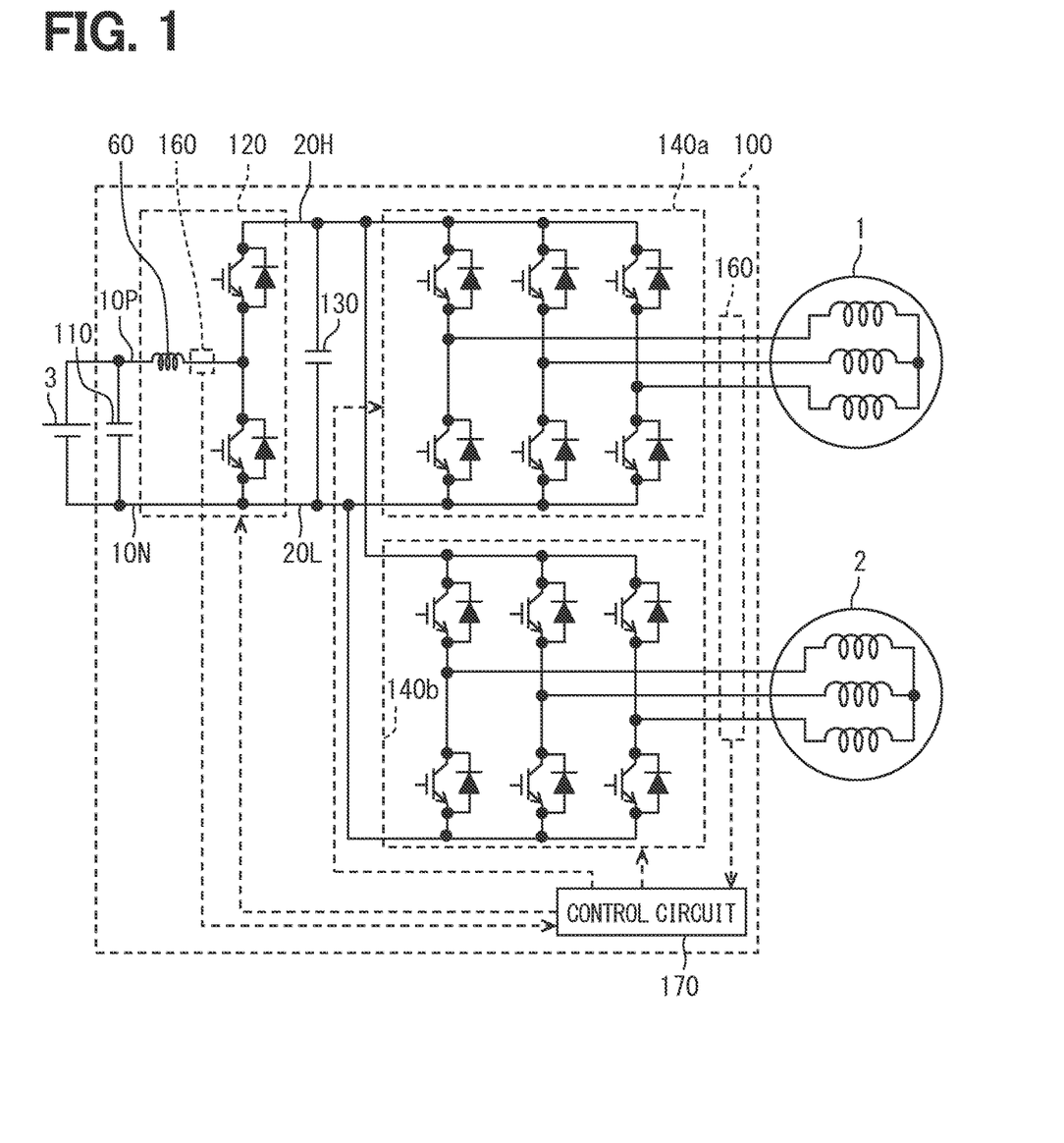
FIG. 1 illustrates a circuitry structure of a power converter.

The first rotating electrical machine 1 and the second rotating electrical machine 2 are three-phase alternating current rotating electrical machines. The first rotating electrical machine 1 is mainly adopted as, for example, a traveling drive source for a vehicle. The second rotating electrical machine 2 is mainly adopted as a generator that generates power by using rotational driving force output from, for example, the internal combustion engine of the vehicle. The direct current power supply 3 is a power supply unit for outputting a direct current voltage that includes a rechargeable secondary battery such as a lithium ion battery.

As an example of power conversion, the power converter 100 converts the direct current voltage from the direct current power supply 3 into a three-phase alternating current provided to the first rotating electrical machine 1. As a result, the power converter 100 provides so-called EV drive for driving the vehicle by the first rotating electrical machine 1 with the power charged by the direct current power supply 3. As another example, the power converter 100 converts a three-phase alternating current provided from the second rotating electrical machine 2 generated by the rotating drive force in the internal combustion engine into another three-phase alternating current with a different frequency or the like, and outputs the converted three-phase alternating current to the first rotating electrical machine 1. As a result, the power converter 100 provides so-called EV drive for driving the vehicle by the first rotating electrical machine 1 with the rotating drive force in the internal combustion engine.

The application of each of the first rotating electrical machine 1 and the second rotating electrical machine 2 in the vehicle is not limited to the above description, and may be appropriately modified, added or replaced according to the design of a vehicle. The operation of the power converter 100 is not limited to the above description, and may be appropriately modified, added or replaced. The power converter 100 includes a filter capacitor 110, a converter 120, a smoothing capacitor 130, a first inverter 140a, a second inverter 140b, a sensor unit 160 and a control circuit 170.

The filter capacitor 110 is a capacitor disposed between a positive electrode line 10P and a negative electrode line 10N. The positive electrode line 10P is connected to a positive electrode of the direct current power supply 3, and the negative electrode line 10N is connected to a negative electrode of the direct current power supply 3. The filter capacitor 110 functions as a filter for removing the noise of the direct current voltage supplied to the converter 120 from the direct current power supply 3.

The converter 120 is a converter circuit that converts the direct current voltage to a direct current voltage with a different value. The converter circuit includes, for example, a semiconductor switching element and a reactor. In the present embodiment, a reverse conducting insulated gate bipolar transistor is adopted as the semiconductor switching element. The converter 120 is adopted for the conversion of the direct current voltage between the direct current power supply 3 and each of the first inverter 140a and the second inverter 140b. For example, the converter 120 executes an operation to boost the direct current voltage supplied as a voltage between the positive electrode line 10P and the negative electrode line 10N from the direct current power supply 3. The converter 120 has a function to supply the boosted voltage as a voltage between a high potential line 20H and a low potential line 20L to, for example, the first inverter 140a.

The converter 120 has two semiconductor switching elements connected in series between the high potential line 20H and the low potential line 20L. The converter 120 includes a reactor 60 arranged to connect a connection node between the semiconductor switching elements and the positive electrode line 10P.

The smoothing capacitor 130 is a capacitor disposed between the high potential line 20H and the low potential line 20L. The smoothing capacitor 130 has a function to smoothen the voltage supplied between the high potential line 20H and the low potential line 20L due to boosting executed by the converter 120.

Each of the first inverter 140a and the second inverter 140b is a converter circuit for the conversion between the direct current voltage and the three-phase alternating current. The converter circuit includes, for example, multiple switching elements. Each of the first inverter 140a and the second inverter 140b includes three upper arms and three lower arms corresponding to three phases. Sets of the upper and lower arms are connected in parallel, and respectively connect the high potential line 20H and the low potential line 20L. Each set of the upper and lower arms includes two semiconductor switching elements connected in series between the high potential line 20H and the low potential line 20L. The connection node between two semiconductor switching elements in each set of the upper and lower arms is connected to a corresponding phase in the rotating electrical machine.

The first inverter 140a is connected to the first rotating electrical machine 1. The first inverter 140a converts the direct voltage between the high potential line 20H and the low potential line 20L supplied from, for example, the converter 120, to the three-phase alternating current and then supplies the three-phase alternating current to the first rotating electrical machine 1.

The second inverter 140b is connected to the second rotating electrical machine 2. The second inverter 140b rectifies the three-phase alternating current generated by the power generation of, for example, the second rotating electrical machine 2, and outputs the rectified three-phase alternating current as the direct current voltage between the high potential line 20H and the low potential line 20L.

The sensor unit 160 is a device for detecting the current flowing through each unit of the power converter 100. The sensor unit 160 detects the current between the first inverter 140a and the first rotating electrical machine 1, the current between the second inverter 140b and the second rotating electrical machine 2, and the current flowing through the converter 120. The specific structure of the sensor unit 160 is described hereinafter.

The control circuit 170 is a circuitry group that exhibits a function to control the operation of the semiconductor switching element in each of the converter 120, the first inverter 140a and the second inverter 140b. The control circuit 170 mainly includes, for example, a microcomputer including a memory storing control software and a processor for executing the control software. The control circuit 170 controls the power conversion by controlling the operation of each of the semiconductor switching elements based on, for example, the current detected by the sensor unit 160.

For example, the control circuit 170 sets a target variation pattern of the current flowing through the corresponding phase of the first rotating electrical machine 1 based on the output torque request of the first rotating electrical machine 1 from a host ECU in the vehicle. The control circuit 170 executes the feedback control of the first inverter 140a to vary the output current from the first inverter 140a to the first rotating electrical machine 1 according to the target variation pattern. That is, the control circuit 170 drives each of the semiconductor switching elements in the first inverter 140a based on the output current of the first inverter 140a in the sensor unit 160.

As another example, the control circuit 170 is adopted to detect the current flowing through the converter 120 for detecting, for example, wheel slippage. The control circuit 170 determines the wheel slippage in a case where, for example, the current flowing through the converter 120 increases by several tens of percent or more with respect to an assumed current. That is, the current flowing through the converter 120 in the present embodiment is adopted for control that is less susceptible to crosstalk with the second rotating electrical machine 2 than the current flowing to the first rotating electrical machine 1.

Figure 2:
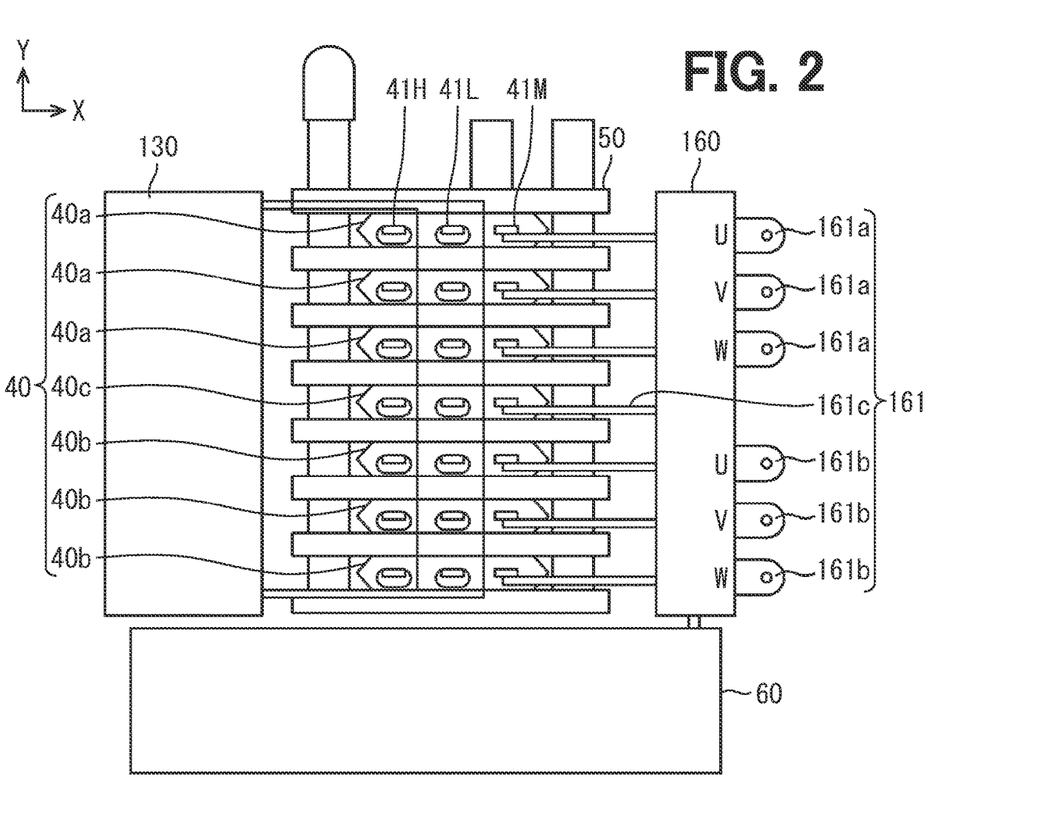
FIG. 2 illustrates a mechanical structure of the power converter.

The following describes the mechanical structure of the power converter 100. Hereinafter, three directions perpendicular to each other are denoted as an X-direction, a Y-direction, and a Z-direction. As illustrated in FIG. 2, the power converter 100 includes multiple semiconductor devices 40 and a cooler 50 for storing these semiconductor devices 40. The power converter 100 also includes the smoothing capacitor 130 and the sensor unit 160 arranged to sandwich the cooler 50 in the X-direction. The power converter 100 includes the cooler 50, the sensor unit 160, and the reactor 60 arranged at one side of the smoothing capacitor 130 in the Y-direction.

The semiconductor device 40 is a device in which the semiconductor switching elements and the connection member for electrically connecting these semiconductor switching elements are integrally packaged by, for example, resin sealing. Each of the semiconductor devices 40 in the present embodiment is formed in a substantially rectangular plate shape, and includes semiconductor switching elements corresponding to upper and lower arms for a single phase, and includes the connection member for the semiconductor switching elements. The semiconductor devices 40 are stacked in the Y-direction with the coolant channel of the cooler 50 interposed therebetween.

Each of the semiconductor devices 40 has three main terminals respectively as a high potential terminal 41H, a low potential terminal 41L and a connection node terminal 41M. The high potential terminal 41H corresponds to the connection node connected with the high potential line 20H in a set of the upper and lower arms. The low potential terminal 41L corresponds to the connection node connected with the low potential line 20L in a set of the upper and lower arms. The connection node terminal 41M corresponds to an intermediate connection node between the semiconductor switching elements in a set of the upper and lower arms. Three main terminals are respectively aligned in the X-direction, and respectively protrude from the surface facing the semiconductor device 40 in the Z-direction. Main terminals of the same type protruding from different semiconductor devices 40 are arranged in the Y-direction. Each of The connection node terminals 41M is aligned and is the closest to the sensor unit 160 among the three main terminals.

The power converter 100 in the present embodiment includes seven semiconductor devices 40 included in the converter 120, the first inverter 140a, and the second inverter 140b. Specifically, the power converter 100 includes three devices 40a for the first electrical machine, three devices 40b for the second electrical machine, and a single device 40c for the converter.

Each of the three devices 40a for the first electrical machine is included in a set of the upper and lower arms corresponding to a single phase of the first inverter 140a. The first inverter 140a includes three devices 40a for the first electrical machine. Among the seven semiconductor devices 40 aligned in the Y-direction, three semiconductor devices 40 at an end farther from the reactor 60 correspond to the devices 40a for the first electrical machine.

Each of the three devices 40b for the second electrical machine is included in a set of the upper and lower arms corresponding to a single phase of the second inverter 140b. The second inverter 140b includes three devices 40b for the second electrical machine. Among the seven semiconductor devices 40 aligned in the Y-direction, three semiconductor devices 40 at an end closer to the reactor 60 correspond to the devices 40b for the second electrical machine.

The device 40c for the converter is included in a set of the upper and lower arms in the converter 120. The device 40c for the converter and the reactor 60 are included in the converter 120. Among the seven semiconductor devices 40 aligned in the Y-direction, a device located at the center corresponds to the device 40c for the converter. That is, the device 40c for the converter is arranged between the three devices 40a for the first electrical machine included in the first inverter 140a and the devices 40b for the second electrical machine included in the second inverter 140b. In other words, the devices 40a for the first electrical machine are arranged to be separated from the devices 40b for the second electrical machine with the device 40c for the converter interposed between the devices 40a for the first electrical machine and the devices 40b for the second electrical machine.

Figure 3:
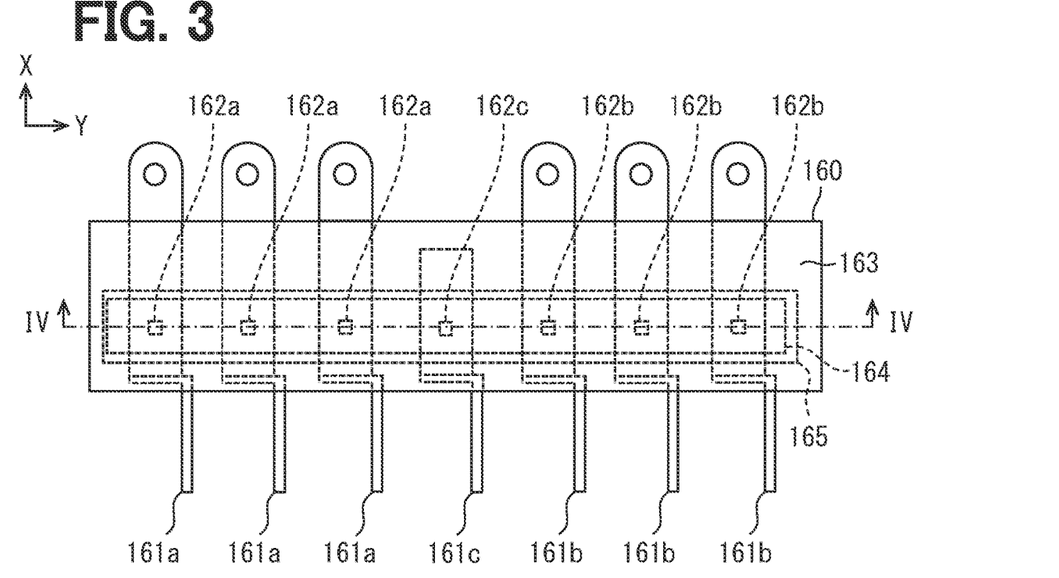
FIG. 3 illustrates a structure of a sensor unit.
Figure 4:
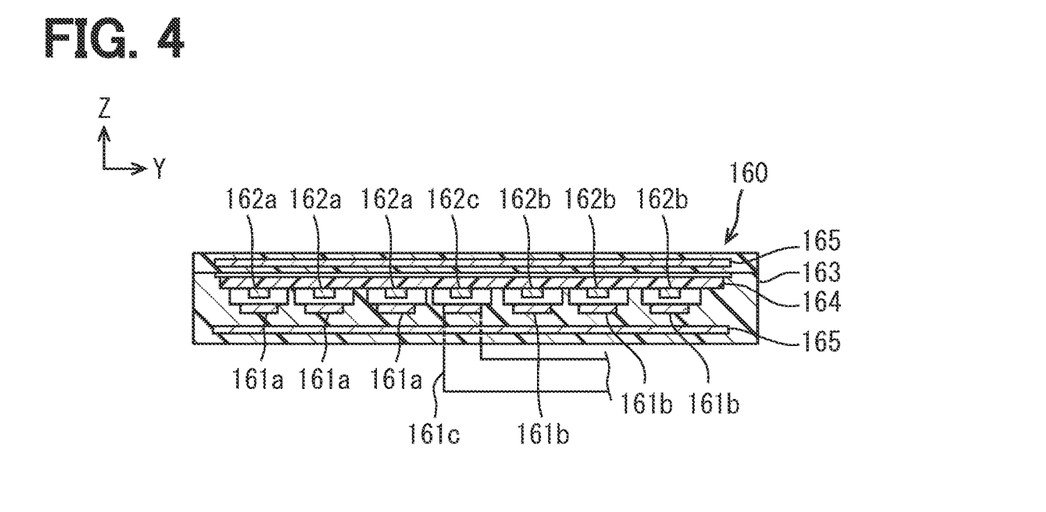
FIG. 4 is a cross-sectional view taken along a line IV-IV of FIG. 3.

The sensor unit 160 is a device in which the busbar 161 through which a current as a detection target flows and the current sensor 162 for detecting the current flowing through the busbar 161 are integrated packaged. The sensor unit 160 in the present embodiment also functions as an output terminal block for assembling connectors for connection extending from the first rotating electrical machine 1 and the second rotating electrical machine 2. As illustrated in FIG. 2, FIG. 3, and FIG. 4, the sensor unit 160 includes a sensor housing 163, the multiple busbars 161, the multiple current sensors 162, a sensor substrate 164 and a magnetic shield 165.

The sensor housing 163 holds the members included in the sensor unit 160. The sensor housing 163 is formed by insulating material such as resin. The sensor housing 163 in the present embodiment is a case made of resin in which the busbar 161 and the magnetic shield 165 are embedded by insert molding, and the sensor substrate 164 are stored in a storage space inside the sensor housing 163.

The busbar 161 is an electrical conductive member that is formed in a strip shape made of conductive material such as copper and allows the current as the detection target to flow through the busbar 161. The sensor unit 160 in the present embodiment has seven busbars 161 extending in parallel in the X-direction and aligned in the Y-direction. Therefore, the Y-direction corresponds to the alignment direction of the busbars 161. Specifically, the sensor unit 160 includes three busbars 161a for the first electrical machine, three busbars 161b for the second electrical machine, and a single busbar 161c for the converter.

The busbars 161 are held integrally by the sensor housing 163 to main the mutual positional relationship. A part of both ends of each of the busbars 161 is exposed to the outside of the sensor housing 163 for electrical and mechanical connection. An end of each of the busbars 161 protrudes from the sensor housing 163 in the X-direction towards the semiconductor device 40 corresponding to a connection target.

At least a portion of a part of each of the busbars 161 located inside the sensor housing 163 is extends in the X-direction with the main surface facing the Z-direction. A portion related to the orientation of the main surface facing the Z-direction is a detected portion to be detected by the current sensor 162. The busbars 161 are arranged such that at least a portion of the detection portion overlaps to each other in a projection view in the Y-direction. The alignment order of the respective detected portions of the busbars 161 in the Y-direction matches the alignment order of the corresponding semiconductor devices 40 in the Y-direction.

Among the seven busbars 161 aligned in the Y-direction, the three busbars 161a for the first electrical machine are three devices located at an end of the sensor unit 160 at a side farther from the reactor 60. An end of each of the three busbars 161a for the first electrical machine is connected to the connection node terminal 41N of the corresponding device 40a for the first electrical machine by, for example, welding. The busbar 161a for the first electrical machine and the device 40a for the first electrical machine correspond to those having the identical alignment order in the Y-direction. More specifically, the busbar 161a for the first electrical machine and the device 40a for the first electrical machine corresponds to the first end group at a side farther from the reactor 60, corresponds to the second end group adjacent to the first end group, and corresponds to the third end group adjacent to the second end group. The device 40a corresponds to a first device. The busbar 161a corresponds to a first busbar.

The other end of each of the three busbars 161a for the first electrical machine is a terminal protruded from the sensor housing 163 and connected to a connector of the first rotating electrical machine 1. Therefore, the busbar 161a for the first electrical machine is electrically connected between the first inverter 140a and the first rotating electrical machine 1. The three-phase alternating current output to the first rotating electrical machine 1 from the first inverter 140a flows to the busbar 161a for the first electrical machine during, for example, HV driving. In this case, each busbar 161a for the first electrical machine generates a magnetic field whose strength and orientation periodically changes according to the frequency of the three-phase alternating current supplied to the first rotating electrical machine 1.

Among the seven busbars 161 aligned in the Y-direction, the three busbars 161b for the second electrical machine are three devices located at an end of the sensor unit 160 at a side closer to the reactor 60. An end of each of the three busbars 161a for the second electrical machine is connected to the connection node terminal 41M of the corresponding device 40b for the second electrical machine by, for example, welding. The busbar 161b for the second electrical machine and the device 40b for the second electrical machine correspond to those having the identical alignment order in the Y-direction. More specifically, the busbar 161b for the second electrical machine and the device 40b for the second electrical machine corresponds to the first end group at a side closer to the reactor 60, corresponds to the second end group adjacent to the first end group at a side opposite from the reactor 60, and corresponds to the third end group adjacent to the second end group at a side opposite from the reactor 60. The busbar 161b corresponds to a second busbar. The device 40b corresponds to a second device.

The other end of each of the three busbars 161b for the second electrical machine is a terminal protruded from the sensor housing 163 and connected to a connector of the second rotating electrical machine 2. Therefore, the busbar 161b for the second electrical machine is electrically connected between the second inverter 140b and the second rotating electrical machine 2. The three-phase alternating current is output to the second inverter 140b from the second rotating electrical machine 2 that is generating power. The three-phase current flows to the busbar 161b for the second electrical machine during, for example, HV driving. In this case, each busbar 161b for the second electrical machine generates a magnetic field whose strength and orientation periodically changes according to the frequency of the three-phase alternating current determined based on the rotational number of the second rotating electrical machine 2.

Among the seven busbars 161 aligned in the Y-direction, the busbar 161c for the converter is the one that is located at the center. An end of the busbar 161c for the converter is electrically and mechanically connected to the connection node terminal 41M of the corresponding device 40c for the converter. The other end of the busbar 161c for the converter is exposed for the sensor housing 163 to be indirectly or directly connected to an end of the reactor 60. The other end of the busbar 161c for the converter in the present embodiment protrudes in the Z-direction from the sensor housing 163 at a position between the busbar 161a for the first electrical machine and the busbar 161b for the second electrical machine in the Y-direction. The busbar 161c corresponds to a converter busbar. The device 40c corresponds to a converter device.

The other end of the busbar 161c for the converter protruded from the sensor housing 163 extends toward the reactor 60 in the Y-direction outside the sensor housing 163, and is connected to the reactor 60 by, for example, welding. The busbar 161c for the converter electrically connects the connection node between the semiconductor switching elements in the converter 120 and the reactor 60. The current in the converter 120 flowing through the reactor 60 flows to the busbar 161c for the converter. The current flowing through the busbar 161c for the converter can be regarded as a direct current whose direction and magnitude are generally constant in accordance with the power supply between the direct current power supply 3 and the power converter 100. The busbar 161c for the converter generates a magnetic field whose direction and magnitude fluctuate less over time than the magnetic field generated by the busbar 161b for the second electrical machine.

The current sensor 162 is a device that detects a current flowing through each of the busbars 161 by detecting the strength of the magnetic field generated by the current. The current sensor 162 is a sensor package that includes a semiconductor substrate at which a magnetoelectric transducer such as a Magneto Resistive Effect Device. The current sensor 162 outputs, as an electrical signal, a detected value indicating, for example, the strength and orientation of the magnetic field along a predetermined detection axis at its own position.

The current sensors 162 mount on the sensor substrate 164 that are aligned in the Y-direction. The electrical signal output from the corresponding current sensor 162 is sent to the control circuit 170 through a common signal connector mounting on the sensor substrate 164. The distance between the adjacent current sensors 162 in the Y-direction is set to match the distance between the adjacent busbars 161 in the Y-direction. By assembling the sensor substrate 164 to the sensor housing 163 for holding the corresponding busbar 161, the corresponding current sensor 162 is placed to have a predetermined positional relationship with the corresponding busbar 161. Specifically, the current sensors 162 are aligned in the Z-direction to face the portion of the corresponding busbars 161 at which the main surface faces the Z-direction.

The detection axis of the current sensor 162 is in the Y-direction. The current sensor 162 generates a magnetic field generated by the current flowing in the X-direction at a position facing the main surface of the busbar 161 facing the Z-direction. The current sensor 162 directly detects the generated magnetic field.

A member made of magnetic material is not disposed at both sides of the current sensor 162 in the Y-direction. The member of the magnetic material is not arranged between the current sensor 162 and the busbar 161 adjacent to another busbar 161 corresponding to another current sensor 162. That is, all of the current sensors 162 in the sensor unit 160 are coreless current sensors without magnetic core surrounding the corresponding busbars 161. Therefore, the magnetic field detected by the corresponding current sensor 162 is partially superimposed with the magnetic field component generated from the busbar 161 adjacent to the corresponding busbar 161. That is, a component that is attenuated according to the distance between the adjacent busbars 161 and the angle with respect to the detection axis is superimposed on the corresponding current sensor 162. The sensor unit 160 includes seven current sensors 162. Particularly, the sensor unit 160 includes three sensors 162a for the first electrical machine, three sensors 162b for the second electrical machine and a converter sensor 162c for the converter.

The sensors 162a for the first electrical machine are provided in one to one with the busbars 161a for the first electrical machine. The sensor 162a for the first electrical machine detects the current flowing through the corresponding busbar 161a for the first electrical machine. The sensor 162a for the first electrical machine is disposed to be apart from the busbar 161b for the second electrical machine with the busbar 161c for the converter interposed between the sensor 162a for the first electrical machine and the busbar 161b for the second electrical machine in the Y-direction. At the plane where the busbar 161c for the converter and the busbar 161b for the second electrical machine are aligned, the busbar 161c for the converter is disposed between a position projecting the sensor 162a for the first electrical machine and the busbar 161b for the second electrical machine. In other words, the busbar 161b for the second electrical machine is disposed to be farther from busbar 161c for the converter than the sensor 162a for the first electrical machine. The sensor 162a corresponds to a first sensor.

With such an arrangement, the sensor 162a for the first electrical machine closest to the busbar 161b for the second electrical machine is adjacent to the busbar 161c for the converter but not the busbar 161b for the second electrical machine. The component of the current flowing through the adjacent busbar 161 superimposed on the detected value of the sensor 162a for the first electrical machine can be prevented from fluctuation of the orientation and magnitude over time, as compared with a case where the sensor 162a for the first electrical machine is adjacent to the busbar 161b for the second electrical machine. That is, the waveform of the detected current is less likely to be distorted. As a result, it is possible to suppress the distortion of the waveform while suppressing an increase in the physical size of the sensor unit 160 due to an increase of the spacing between the busbar 161a for the first electrical machine and the busbar 161b for the second electrical machine.

The sensors 162b for the second electrical machine are provided in one to one with the busbars 161b for the second electrical machine. The sensor 162b for the second electrical machine detects the current flowing through the corresponding busbar 161b for the second electrical machine. The sensor 162b for the second electrical machine is disposed to be apart from the busbar 161a for the first electrical machine with the busbar 161c for the converter interposed between the sensor 162b for the second electrical machine and the busbar 161a for the first electrical machine in the Y-direction. The sensor 162b corresponds to a second sensor.

The converter sensor 162c for the converter corresponds to the busbar 161c for the converter, and detects the current flowing through the busbar 161c for the converter. The converter sensor 162c for the converter is disposed between the sensor 162a for the first electrical machine and the sensor 162b for the second electrical machine adjacent to each other in in the Y-direction. In the project view in the direction in which the sensor 162a for the first electrical machine and the sensor 162b for the second electrical machine are aligned, at least a portion of the converter sensor 162c for the converter overlaps the sensor 162a for the first electrical machine and the sensor 162b for the second electrical machine.

In addition to the current actually flowing through the busbar 161c for the converter, the component of the current flowing through the adjacent busbars 161 at both sides is partially superimposed on the detected value of the converter sensor 162c for the converter. That is, the alternating current components of the busbar 161a for the first electrical machine and the busbar 161b for the second electrical machine are superimposed to form a direct current including a pulsating current component. As described above, even though the current detected at the converter sensor 162c for the converter includes such a pulsating current component, the control of the control circuit 170 is not substantially affected.

The magnetic shield 165 is made of magnetic material and formed into a plate shape, and is arranged with both surfaces facing each other in the Z-direction. The magnetic shields 165 are respectively disposed at a side of the current sensors 162 opposite from the busbars 161 in the Z-direction and at a side of the busbars 161 opposite from the current sensors 162. The magnetic shields 165 in the present embodiment are formed in a strip shape extending in the Y-direction, and are provided to cover all of the seven current sensors 162 in the projection view in the Z-direction. The magnetic shield 165 suppresses the influence of the external magnetic field of the sensor unit 160 on the detected value of the current sensor 162. The magnetic shield 165 may be divided in the Y-direction, and may be individually provided for each of current sensors 162.

Summary of Embodiment

According to the embodiment described above, the busbar 161b for the second electrical machine is disposed to be apart from the sensor 162a for the first electrical machine with the busbar 161c interposed between the busbar 161b for the second electrical machine and the busbar 162a for the first electrical machine. Therefore, it is possible to suppress the superimposition of the frequency component of the three-phase alternating current flowing through the busbar 161b for the second electrical machine on the detected value detected by the sensor 162a for the first electrical machine. The control circuit 170 controls the first inverter 140a based on the detected value detected by the sensor 162a for the first electrical machine to suppress the influence of the three-phase alternating current flowing through the busbar 161b for the second electrical machine and operate the first inverter 140a. Therefore, it is possible to suppress the distortion of the output current flowing from the first inverter 140a to the first rotating electrical machine 1 to detect the output current through the coreless current sensor 162.

In the present embodiment, the converter sensor 162c for the converter is disposed between the sensor 162a for the first electrical machine and the sensor 162b for the second electrical machine. In contrast to the above structure, in a case where the converter sensor 162c for the converter is disposed at another position, an increase in the physical size of the sensor unit 160 due to an increase in the number of other members or enlargement of the other members such as the magnetic shield 165 may occur. In response to such a concern, in the present embodiment, the converter sensor 162c for the converter is disposed to suppress, for example, an increase in the number of other members or enlargement of the other members. Therefore, the power converter 100 can suppress enlargement of the physical size of the sensor unit 160 while suppressing the influence on the control based on the current detected by the sensor unit 160.

The semiconductor devices 40 in the present embodiment are aligned in the order identical to the busbars 161 respectively connected to the semiconductor devices 40 in the Y-direction. In contrast to the above structure, in a case where the alignment order of the semiconductor devices 40 is different from the alignment order of some of the busbars 161 facing the current sensors 162, some of the busbars 161 bypass other busbars 161 and are connected to the corresponding semiconductor devices 40, and an increase in the physical size of the sensor unit 160 occurs. To address such a concern, in the present embodiment, the busbars 161 are correspondingly connected to the semiconductor devices 40 without bypassing other busbars 161. Therefore, the power converter may be disposed to separate the busbar 161b for the second electrical machine from the sensor 162a for the first electrical machine while suppressing an increase in the physical size of each of the busbars 161.

In the present embodiment, all of the current sensors 162 are integrally held with the busbars 161 by the sensor housing 163. In contrast to the above structure, in a case where the current sensors 162 are individually attached to the busbars 161, an increase in the number of members or physical size of the sensor unit 160 may occur. To address such a concern, in the present embodiment, it is possible to attach the current sensors 162 to the busbars 161 correspondingly while suppressing an increase in the number of members or physical size through the sensor housing 163 for integrally holding the current sensors 162 and the busbars 161.

Other Embodiments

Although the embodiments of the present disclosure have been described above, the present disclosure is not limited to the above-described embodiments, and the following modified examples are also included in the technical scope of the present disclosure, and furthermore, various changes can be made within the range that does not deviate from the scope. In the following description, elements having the same reference numerals as those used so far are the same as elements having the same reference numerals in the previous embodiments, except when specifically mentioned. When only a part of the configuration is described, the embodiment described above can be applied to other parts of the configuration.

In the above embodiment, the power converter 100 includes two rotating electrical machines and two inverters respectively connected to the two rotating electrical machines, and adopts a single-phase converter as the converter 120. Each of the semiconductor devices 40 included in the power converter 100 includes semiconductor switching elements corresponding to upper and lower arms for a single phase, and includes the connection member for the semiconductor switching elements. As a result, in the above-mentioned embodiment, seven semiconductor devices 40, seven busbars 161 and seven current sensors 162 are disposed. However, if the current sensor corresponding to the busbar to one of the rotating electrical machine is disposed apart from the busbar to the other one of the rotating machine with the busbar 161c for the converter interposed therebetween, the structure of the power converter 100 is not limited to the above description.

Figure 5:
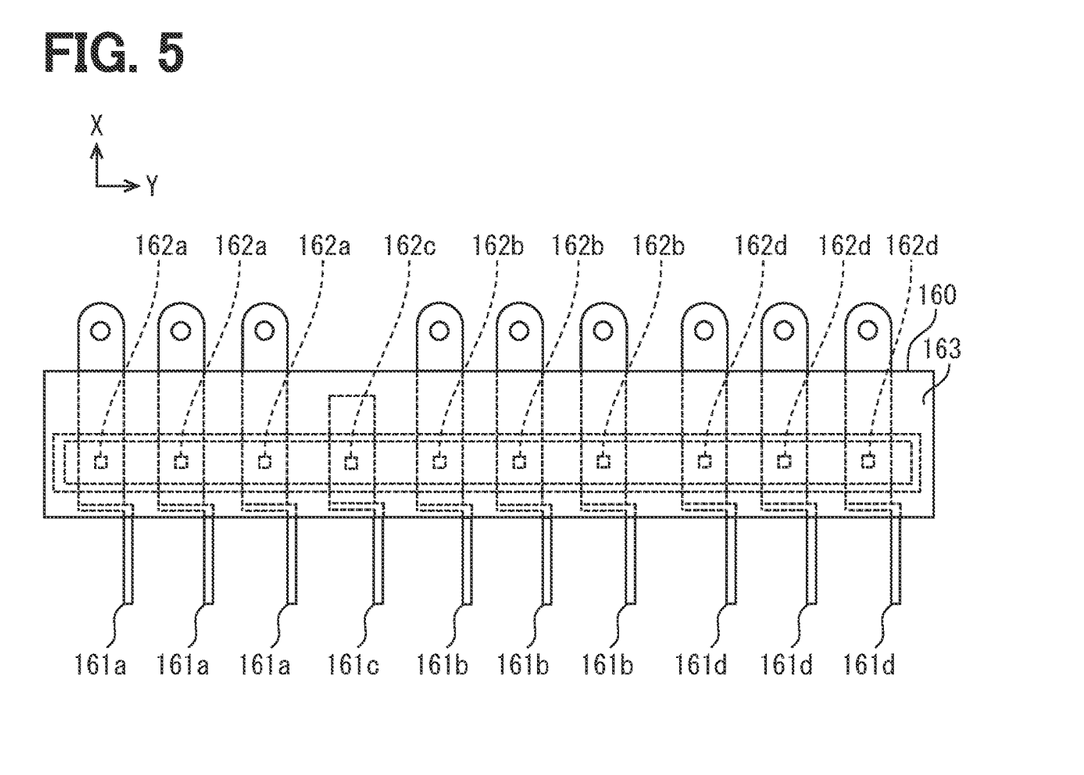
FIG. 5 illustrates a structure of a sensor unit according to a modified example.

As an example, it is possible to adopt a structure in which the power converter 100 further includes a third inverter connected to a third rotating electrical machine. As illustrated in FIG. 5, the power converter 100 with such a structure is further provided with a busbar 161d for the third electrical machine and a sensor 162d for the third electrical machine for detecting the current flowing through the busbar 161d for the third electrical machine. In this case, the busbar 161c for the converter may not have to be provided between the sensor 162d for the third electrical machine and the busbar 161d for the second electrical machine. That is, as long as the busbar 161c for the converter is arranged between the busbar 161 for one of the rotating electrical machines and the current sensor 162 or the other rotating electrical machine, the arrangement relation in the pair of the other rotating electrical machines does not matter.

Figure 6:
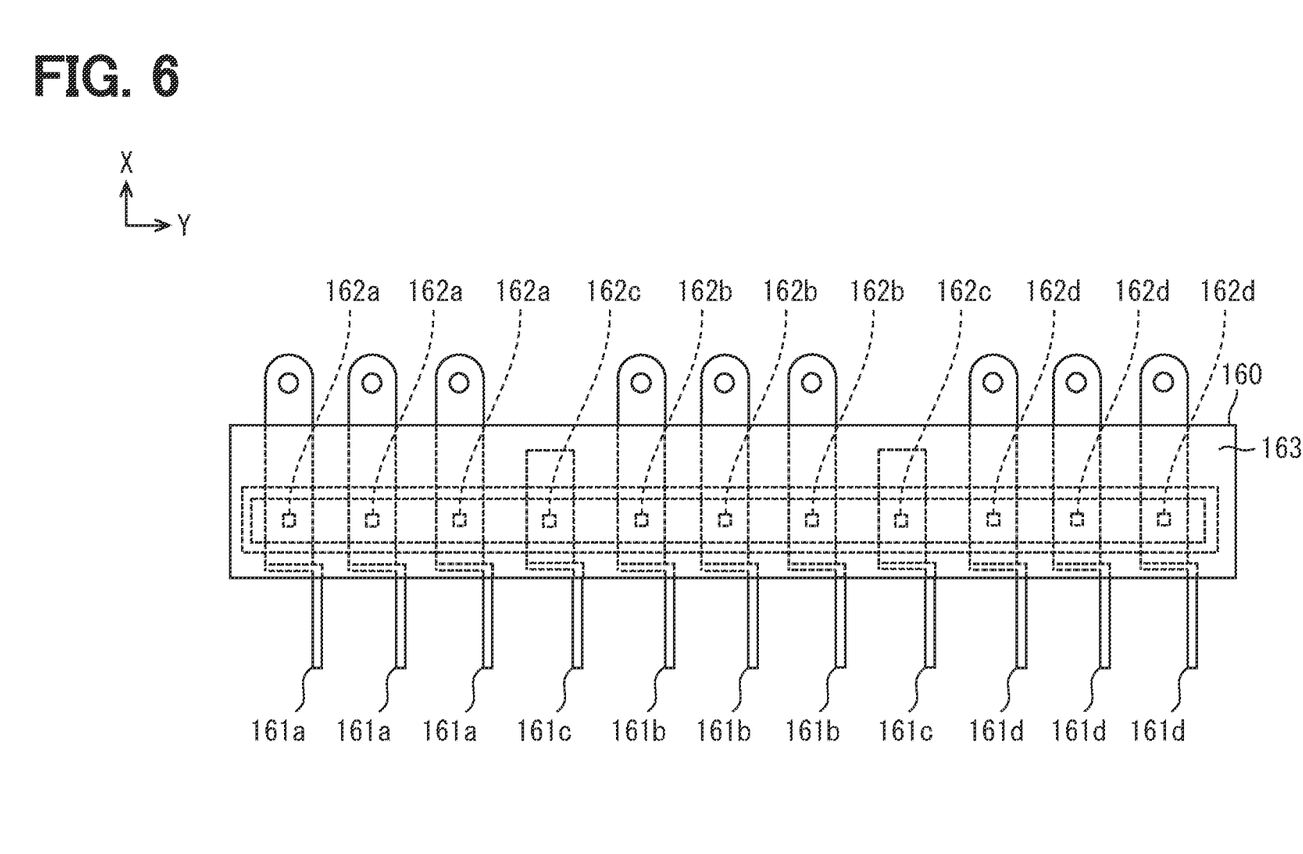
FIG. 6 illustrates a structure of a sensor unit according to another modified example.

As another example, in a case where multiple-phase converter is adopted as the converter 120, multiple busbars 161c for the converter are provided. For example, when a two-phase converter is adopted and the third inverter is included, one of the busbars 161 for one of the rotating electrical machine may be nested between two busbars 161c for the converter. That is, as illustrated in FIG. 6, three busbars 161b for the second electrical machine may be disposed between two busbars 161c for the converter, three busbars 161a for the first electrical machine may be disposed at one of external sides, and three busbars 161d for the third electrical machine may be disposed at the other one of external sides. In a case where multiple busbars 161c for the converter are disposed, it is possible to arrange the busbars 161c for the converter to be adjacent to each other among the busbars for the rotation electrical machine.

It is possible to adopt, for example, a structure in which the multiple semiconductor devices 40 correspond to upper and lower arms or a structure in which a single semiconductor device corresponds to multiple upper and lower arms. When the semiconductor devices 40 are not provided to one-to-one with the busbars 161 with such a structure, the alignment order of the semiconductor devices 40 is different from the alignment order of the busbars 161. With such an alignment, one or more busbars 161 are not parallel to each other.

In the above-mentioned embodiment, the sensors 162a for the first electrical machine are provided to one-to-one with all of the three busbars 161a for the first electrical machine. However, it is also possible to adopt a structure in which two sensors 162a for the first electrical machine are correspondingly provided for two of the three busbars 161a for the first electrical machine, and the remaining one of the three busbars 161a for the first electrical machine may be estimated from the other two busbars 161a for the first electrical machine. In this case, regardless of the arrangement of the busbars 161a for the first electrical machine not provided with the sensors 162a for the first electrical machine, the busbar 161c for the converter may be provided between the sensor 162a for the first electrical machine closest to the busbar 161b for the second electrical machine and the busbar 161b for the second electrical machine.

What is claimed is:

1. A power converter comprising:
 a first inverter configured to be connected to a first rotating electrical machine being a three-phase alternating current rotating electrical machine;
 a second inverter configured to be connected to a second rotating electrical machine being a three-phase alternating current rotating electrical machine;
 a converter having a reactor and configured to execute conversion of a direct current voltage between a direct current power supply and each of the first inverter and the second inverter;
 a first busbar adapted to the first rotating electrical machine, the first busbar configured to pass a current between the first inverter and the first rotating electrical machine;
 a second busbar adapted to the second rotating electrical machine, the second busbar configured to pass a current between the second inverter and the second rotating electrical machine;
 a converter busbar adapted to the converter, the converter busbar configured to pass a current of the converter;
 a first sensor being a coreless sensor adapted to the first rotating electrical machine, the first sensor configured to detect the current flowing through the first busbar based on a magnetic field generated by the current flowing through the first busbar; and
 a control circuit configured to control the first inverter based on a detected value of the first sensor, wherein
 the second busbar is disposed to be apart from the first sensor with the converter busbar interposed between the second busbar and the first sensor,
 the reactor is electrically connected to the converter busbar, and
 the second busbar is located between the converter busbar and the reactor.

2. The power converter according to claim 1, further comprising:
 a second sensor being a coreless sensor adapted to the second rotating electrical machine, the second sensor configured to detect the current flowing through the second busbar based on a magnetic field generated by the current flowing through the second busbar; and
 a converter sensor being a coreless sensor adapted to the converter, the converter sensor configured to detect the current flowing through the converter busbar based on a magnetic field generated by the current flowing through the converter busbar,
 wherein the converter sensor is disposed between the first sensor and the second sensor.

3. The power converter according to claim 1,
 wherein the first inverter includes a first device adapted to the first rotating electrical machine and connected to the first busbar,
 wherein the second inverter includes a second device adapted to the second rotating electrical machine and connected to the second busbar,
 wherein the converter includes a converter device connected to the converter busbar,
 wherein the first busbar corresponding to the first device, the second busbar corresponding to the second device, and the converter busbar corresponding to the converter device are aligned in order in an alignment direction, and
 wherein the first device, the second device, and the converter device are arranged identically with an alignment order of the first busbar, the second busbar and the converter busbar in the alignment direction.

4. The power converter according to claim 1, further comprising:
 a second sensor adapted to the second rotating electrical machine, the second sensor configured to detect the current flowing through the second busbar based on a magnetic field generated by the current flowing through the second busbar;
 a converter sensor adapted to the converter, the converter sensor configured to detect the current flowing through the converter busbar based on a magnetic field generated by the current flowing through the converter busbar; and
 a sensor housing configured to hold the first sensor, the second sensor, the converter sensor, the first busbar, the second busbar and the converter busbar together.

5. The power converter according to claim 1, further comprising:
 a magnetic shield made of magnetic material and disposed to bridge the first busbar, the second busbar and the converter busbar.

6. The power converter according to claim 1, wherein
 the converter further has two semiconductor switching elements connected in series, and
 the reactor is connected to a common connection node between the two semiconductor switching elements.

* * * * *